US008498410B2

(12) United States Patent
Pruss et al.

(10) Patent No.: US 8,498,410 B2
(45) Date of Patent: Jul. 30, 2013

(54) METHODS FOR CUSTOMIZING A RIJNDAEL BLOCK CIPHER

(75) Inventors: Brian W. Pruss, Streamwood, IL (US); Gary W. Schluckbier, Schaumburg, IL (US)

(73) Assignee: Motorola Solutions, Inc., Schaumburg, IA (US)

( * ) Notice: Subject to any disclaimer, the term of this patent is extended or adjusted under 35 U.S.C. 154(b) by 221 days.

(21) Appl. No.: 13/047,298

(22) Filed: Mar. 14, 2011

(65) Prior Publication Data

US 2012/0237020 A1    Sep. 20, 2012

(51) Int. Cl.
*H04L 29/06*    (2006.01)
(52) U.S. Cl.
USPC ............................................................ 380/28
(58) Field of Classification Search
USPC .................................. 380/28; 726/14; 713/168
See application file for complete search history.

(56) References Cited

U.S. PATENT DOCUMENTS

| 7,346,161 | B2* | 3/2008 | Shimoyama ............... 380/29 |
| 7,502,464 | B2 | 3/2009 | Macchetti et al. |
| 7,715,555 | B2* | 5/2010 | Chen ........................... 380/37 |
| 8,155,306 | B2* | 4/2012 | Brickell et al. ............. 380/28 |
| 2003/0039355 | A1* | 2/2003 | McCanny et al. .......... 380/37 |
| 2003/0063751 | A1* | 4/2003 | Bruen et al. ................ 380/278 |
| 2005/0283714 | A1 | 12/2005 | Korkishko et al. |
| 2007/0038867 | A1 | 2/2007 | Verbauwhede et al. |
| 2008/0240422 | A1 | 10/2008 | Ozturk et al. |
| 2008/0267393 | A1* | 10/2008 | Sano .............................. 380/28 |
| 2010/0014673 | A1* | 1/2010 | Lee et al. ...................... 380/270 |
| 2010/0058070 | A1 | 3/2010 | Garay et al. |

OTHER PUBLICATIONS

PCT International Search Report for Application No. PCT/US2012/025797 dated Sep. 25, 2012.
Davood Rezaeilpour, et al. "New Directions in Cryptanalysis of Block Ciphers", Journal of Computer Science 5 (12); 1094-1097, 2009; ISSN 1549-3636; 2009 Science Publications; 4 Pages.
G.N. Krishnamurthy, et al. "Making AES Stronger: AES With Key Dependent S-Box", IJCSNS International Journal of Computer Science and Network Security, vol. 8, No. 9, Sep. 2008; 11 Pages.
Chih-Pin Su, et al. "A Configurable AES Processor for Enhanced Security", 2005 IEEE; 6 Pages.
Sandy Harris, et al. "Key-Dependent S-Box Manipulations" Selected Areas in Cryptography (SAC '99) Proceedings, LNCS 1556, Springer, 1999; Abstract.

* cited by examiner

*Primary Examiner* — Ali Abyaneh
(74) *Attorney, Agent, or Firm* — Valerie M. Davis; Kenneth A. Haas (57) ABSTRACT

A key variable loader receives a set of Rijndael parameters that were verified using a simulation computer, wherein the set of Rijndael parameters provide an input for implementing at least one step of the Rijndael block cipher and when used with a secret key allow a conversion between plain text and cipher text using the Rijndael block cipher. The key variable loader further stores the set of Rijndael parameters and subsequently provides the set of Rijndael parameters to a device having a customizable Rijndael block cipher, like a subscriber unit or a key management facility.

13 Claims, 4 Drawing Sheets

METHODS FOR CUSTOMIZING A RIJNDAEL BLOCK CIPHER

TECHNICAL FIELD

The technical field relates generally to cryptography and more particularly to methods for customizing a Rijndael block cipher.

BACKGROUND

Rijndael is collection of block ciphers used for cryptography applications, and three of the Rijndael block ciphers (also referred to as Rijndael algorithms) were adopted as algorithms for use in Advanced Encryption Standard (AES), which is a symmetric-key encryption standard that was ratified by the National Institute of Standards and Technology (NIST) as United States (U.S.) Federal Information Processing Standard PUB 197 (FIPS 197) on Nov. 26, 2001, and adopted by the U.S. government as a Federal government standard on May 26, 2002. All Rijndael block ciphers receive as inputs a symmetric key (also referred to as a secret key, a cipher key, a cryptographic key, an encryption key, or a decryption key) and plain text or cipher text and implement a cryptographic procedure that uses four basic transforms or transformations (also referred to herein as steps) to convert plain text to cipher text and vice versa and/or for message authentication. The four basic steps are a SubBytes step, a ShiftRows step, a MixColumns step, and an AddRoundKey step.

Due to the AES, at least some variants of Rijndael have been widely accepted for performing cryptographic functions, for instance, for messages containing voice or other media. Nonetheless, certain users of cryptography algorithms require that, in addition to unique secret key variables, there must also be a unique secret component to the design of the algorithm itself. It is known to meet this need by the creation of new secret algorithms, but the logistics of creating and testing such algorithms on third-party equipment complicates this process.

Thus, there exists a need for customizing a cryptographic algorithm and in particular for customizing a Rijndael block cipher.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a key variable loader: receives a set of Rijndael parameters that were verified using a simulation computer, wherein the set of Rijndael parameters provide an input for implementing at least one step of the Rijndael block cipher and when used with a secret key allow a conversion between plain text and cipher text using the Rijndael block cipher; stores the set of Rijndael parameters; and provides the set of Rijndael parameters to a device having a customizable Rijndael block cipher.

In accordance with another embodiment, a device, having a customizable Rijndael block cipher: receives a secret key for input into the Rijndael block cipher; receives, from a key variable loader, a set of Rijndael parameters that were generated and verified by a simulation computer and provided to the key variable loader, wherein the set of Rijndael parameters provide an input for implementing at least one step of the Rijndael block cipher and when used with the secret key allow a conversion between plain text and cipher text using the Rijndael block cipher.

Figure 1:
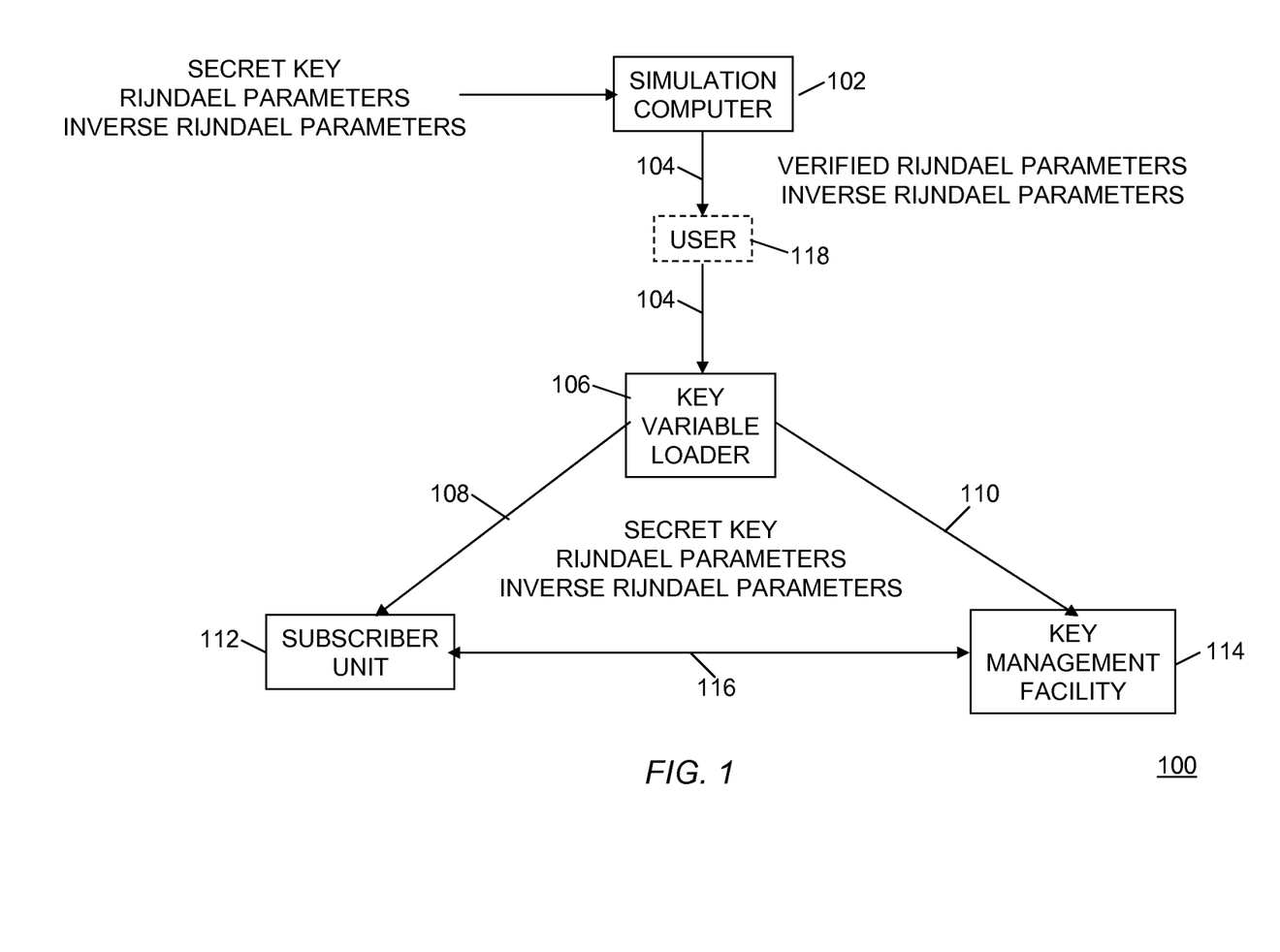
FIG. 1 is a block diagram illustrating a system that uses methods for customizing a Rijndael block cipher in accordance with some embodiments.

Referring now to the drawings, and in particular FIG. 1, a block diagram illustrating a cryptographic system that uses methods for customizing a Rijndael block cipher in accordance with some embodiments is shown and indicated generally at 100. System 100 includes a simulation computer 102, a key variable loader (KVL) 106, a subscriber unit 112, and a key management facility (KMF) 114. Those skilled in the art, however, will recognize and appreciate that the specifics of this example are merely illustrative of some embodiments and that the teachings set forth herein are applicable in a variety of alternative settings. For example, since the teachings described do not depend on the particular variant or variants of Rijndael algorithms used in the system, they can be applied to any type of Rijndael algorithm although an AES implementation is described by reference to this embodiment. As such, other alternative implementations of using different types of Rijndael algorithms are contemplated and are within the scope of the various teachings described. Moreover, only one simulation computer, key variable loader, subscriber unit, and key management facility are shown for simplicity of illustration. However, skilled artisans will realize that in a typical system, additional subscriber units, key management facilities, key variable loaders, and simulation computers may be present.

Turning now to a description of the various components of system 100. The simulation computer 102 can be any suitable all-purpose computer, such as a personal computer, programmed to generate and verify a set of Rijndael parameters that will ultimately be provided to a device within the system 100, which has a customizable Rijndael block cipher. More particularly, the simulation computer 102, itself, includes a customizable Rijndael block cipher, such as a block cipher 200 illustrated in FIG. 2 and is the same Rijndael block cipher that is used by other elements in the system 100 such as the subscriber unit 112 and the key management facility 114. The Rijndael block cipher 200 receives plain text at an input 202, a secret key at an input 204, and a set of one or more Rijndael parameters at an input 206. The secret key and the Rijndael parameters are used to implement one or more steps in the block cipher 202 to convert the plain text to cipher text at an output 208.

As used herein, plain text is defined as media, e.g., voice, data, other alphanumeric characters, etc. (also interchangeably referred to herein a "data"), that are in the clear and are readable without having to further process the plain text with a cryptographic algorithm. On the other hand, cipher text is defined as the result of processing (encrypting) plain text using a cryptographic algorithm and a secret key. A secret key is defined as a unique secret piece of information shared between two or more devices that allows only those devices that know the secret information to understand or read the communications encrypted using the secret key. A Rijndael parameter is defined as an input into a Rijndael block cipher other than a secret key, plain text, or cipher text; and an inverse Rijndael parameter is defined as a calculated inverse of a given Rijndael parameter.

Figure 2:
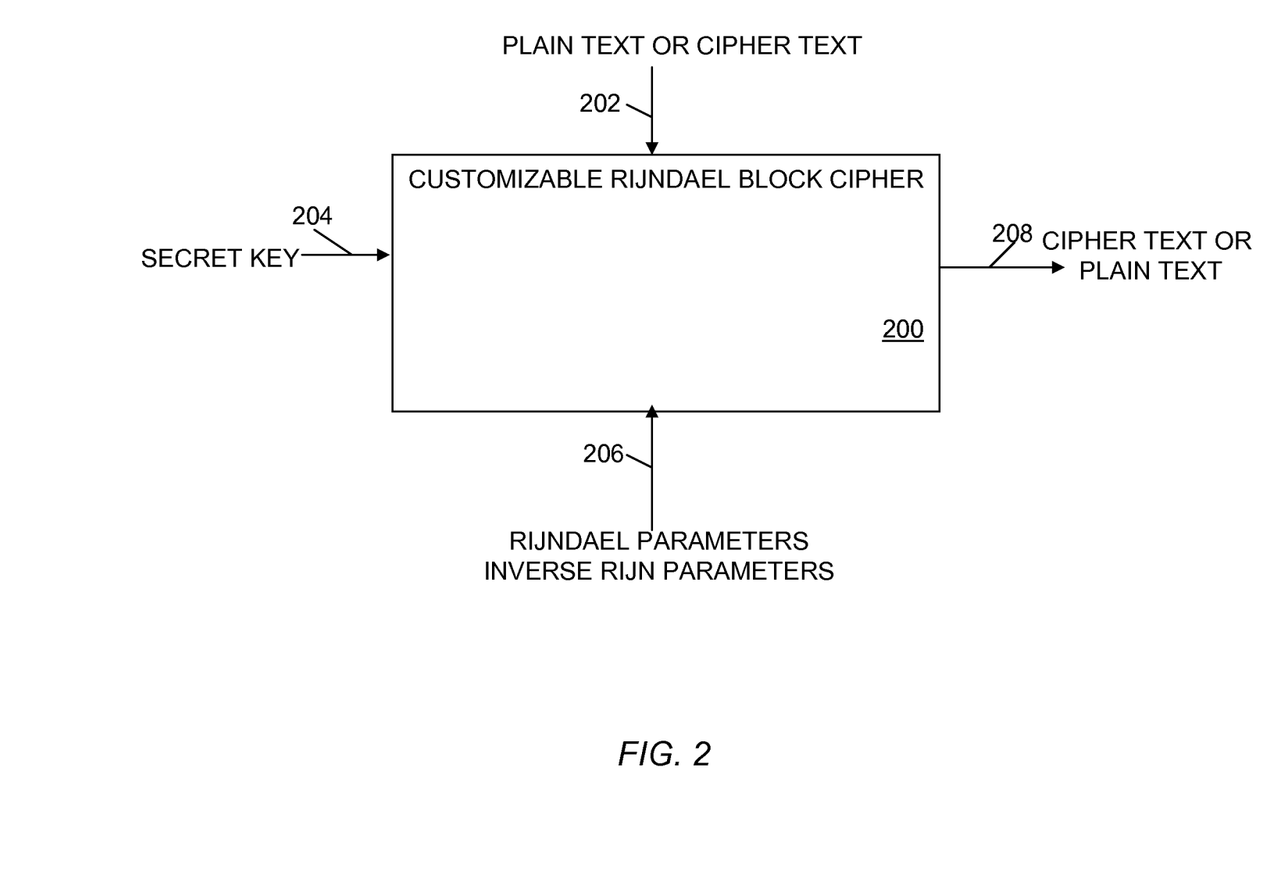
FIG. 2 is a block diagram of a customizable Rijndael block cipher in accordance with some embodiments.

In operation, the simulation computer 102 received from a user (e.g., a native cryptographic authority or other government agency) a secret key and also receives from the user a set of Rijndael parameters to input into the customizable Rijndael block cipher 200, which uses these inputs to encrypt plain text to generate cipher text at the output 208. The simulation computer 102 then performs a mathematical analysis of the output 208 to verify that the output satisfies cryptographic standards for the system 100, e.g., as defined by the user. If the output satisfies such cryptographic standards, the Rijndael parameters used to generate that output 208 are deemed as being "verified." However, if the output fails to satisfy the cryptographic standards for the system 100, then the simulation computer receives another set of Rijndael parameters (using any suitable algorithm) and analyzes the associated output 208 until a given set of Rijndael parameters have been verified. It should be noted that a set of one or more corresponding inverse Rijndael parameters needed for running the customizable Rijndael block cipher 200 can be generated from a given set of Rijndael parameters either within or external to the block cipher 200.

The key variable loader 106 is optionally coupled to the simulation computer 102 using an interface 104 over which the set of verified Rijndael parameters and optionally the corresponding set of verified inverse Rijndael parameters may be sent to eliminate human error involved in manually entering data into the KVL. In one example implementation, the interface 104 is a wired interface for providing extra security when transferring the Rijndael parameters. Although, in alternative implementations, a very short range wireless interface may be used such as a Near Field Communications (NFC) interface. Alternatively, the Rijndael parameters (and optionally the inverse Rijndael parameters) are manually input by a user 118 into the KVL after being verified by the simulation computer. Moreover, a parameter storage format that stores both the Rijndael parameters and the inverse Rijndael parameters facilitates easier key management and implementation, for instance, in a two-way radio system, which has some illustrative advantages.

First it improves performance by avoiding the need to calculate inverses at run time. Secondly, it provides an efficient mechanism for enforcing the validity of the Rijndael parameters. This is because, it's much faster to verify that two parameters are inverses of each other rather than to calculate the inverse, especially if it is not known that an inverse exists. Alternatively, instead of providing inverse Rijndael parameters as an input 206 into the customizable Rijndael block cipher 200, the simulation computer 102 may provide only the Rijndael parameters and let the customizable Rijndael block cipher generate those inverse Rijndael parameters needed to perform the cryptographic algorithm.

A key variable loader is defined herein as a device that is used by an operator of the device to manually load cryptographic parameters (meaning parameters used by a cryptographic algorithm) such as secret keys into another device. In accordance with the present teachings, the key variable loader 106 also loads the verified Rijndael parameters as cryptographic parameters into another device. More particularly, the key variable loader 106 stores the verified Rijndael parameters, and optionally the inverse Rijndael parameters, and forwards these parameters over an interface 108 to the subscriber unit 112 and over an interface 110 to the key management facility 114. In one illustrative implementation both of the interfaces 108 and 110 are wired interfaces, but they could alternatively comprise a wireless interface such as an NFC interface.

The key management facility 114 is a device, such as a server, within the infrastructure of system 100 that generates and manages cryptographic keys (such as the secret keys used by the customizable Rijndael block cipher) within system 100. Instead of manual keying, like the key variable loader 106, the key management facility 114 provides over-the-air (OTAR) rekeying of devices within system 100, such as the subscriber unit 112, wherein the OTAR rekeying of subscriber unit 112 is performed over a wireless interface 116.

The subscriber unit 112 is also referred to in the art as a radio, a user equipment (UE), an access device, an access terminal, a mobile station, a mobile radio, a mobile device, a user device, a communication device, and the like. The subscriber unit can be any type of communication device such as a mobile phone, a mobile data terminal, a Personal Digital Assistant (PDA), a laptop, a two-way radio, a cell phone, a fixed control station, or any other device capable of securely communicating in a wired or wireless environment with one or more other subscriber units or with the infrastructure, such as the KMF 114, by encrypting and decrypting media using a customizable Rijndael block cipher.

The simulation computer 102, KVL 106, subscriber unit 112 and KMF 114 each generally includes a memory (also referred to herein as a memory device), one or more interfaces, and a processing device or processor (although not shown) that are operatively coupled, and which when programmed form the means for these system elements to implement their intended functionality, for example, as illustrated by reference to the methods and diagrams shown in FIGS. 2-4. The interfaces are used at least for passing cryptographic keys and Rijndael parameters and optionally inverse Rijndael parameters between the elements of the system 100.

The implementation of the network interfaces may be wired or wireless, for instance as described above. Where the device supports wired communications, the interfaces may comprise a serial port interface (e.g., compliant to the RS-232 standard), a parallel port interface, an Ethernet interface, a USB interface, and/or a FireWire interface, and other well known interfaces. Where the network supports wireless communications, the network interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

In addition to the above-mentioned functionality, implemented via programmed logic or code, the processor of the system elements may be further programmed with software or firmware logic or code for performing signaling and functionality to facilitate methods in accordance with the teachings disclosed herein, such as, among others, methods described by reference to FIGS. 2-4. Furthermore, the processing device may be implemented in hardware, for example, as a state machine or an application specific integrated circuit, "ASIC" to perform such functionality. The memory in a device includes any readily recognizable combination of short-term and long-term storage of software or firmware for programming the processing device with the logic or code needed to perform its functionality and for storage of various data or information needed for the functioning of the device.

Figure 3:
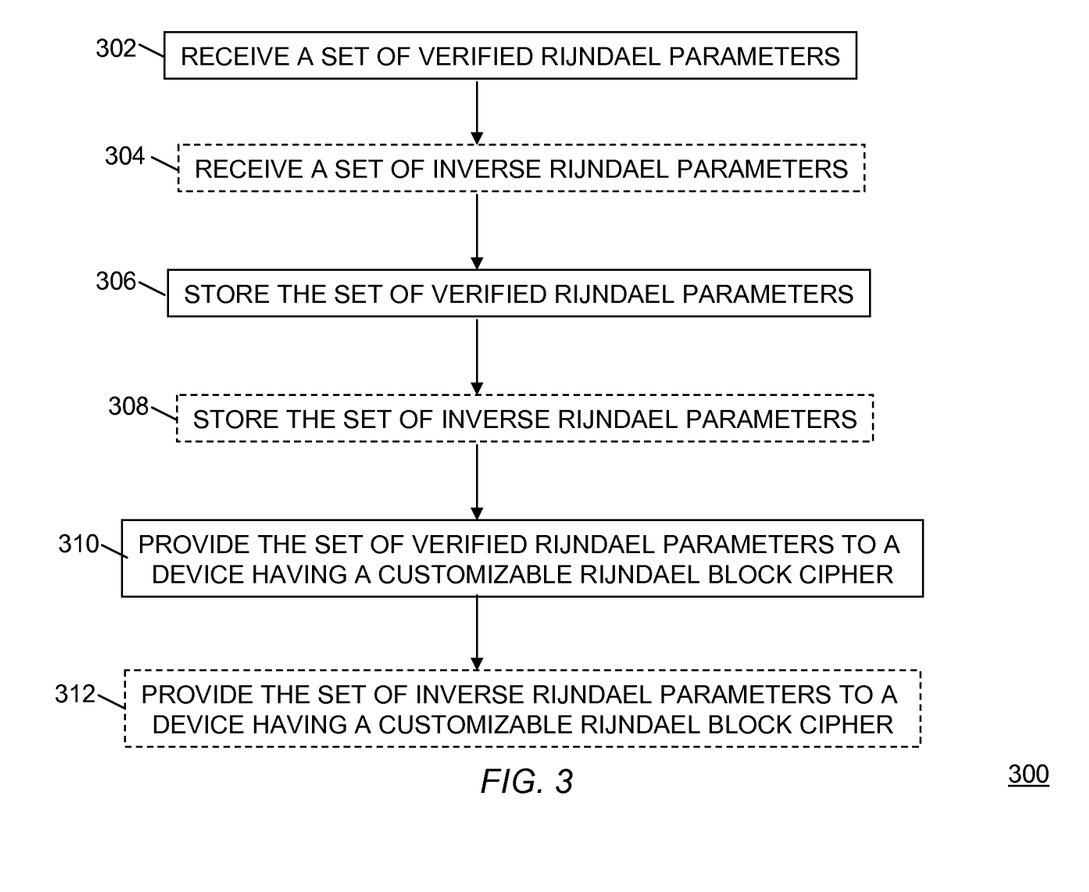
FIG. 3 is a flow diagram illustrating a method for customizing a Rijndael block cipher in accordance with some embodiments.
Figure 4:
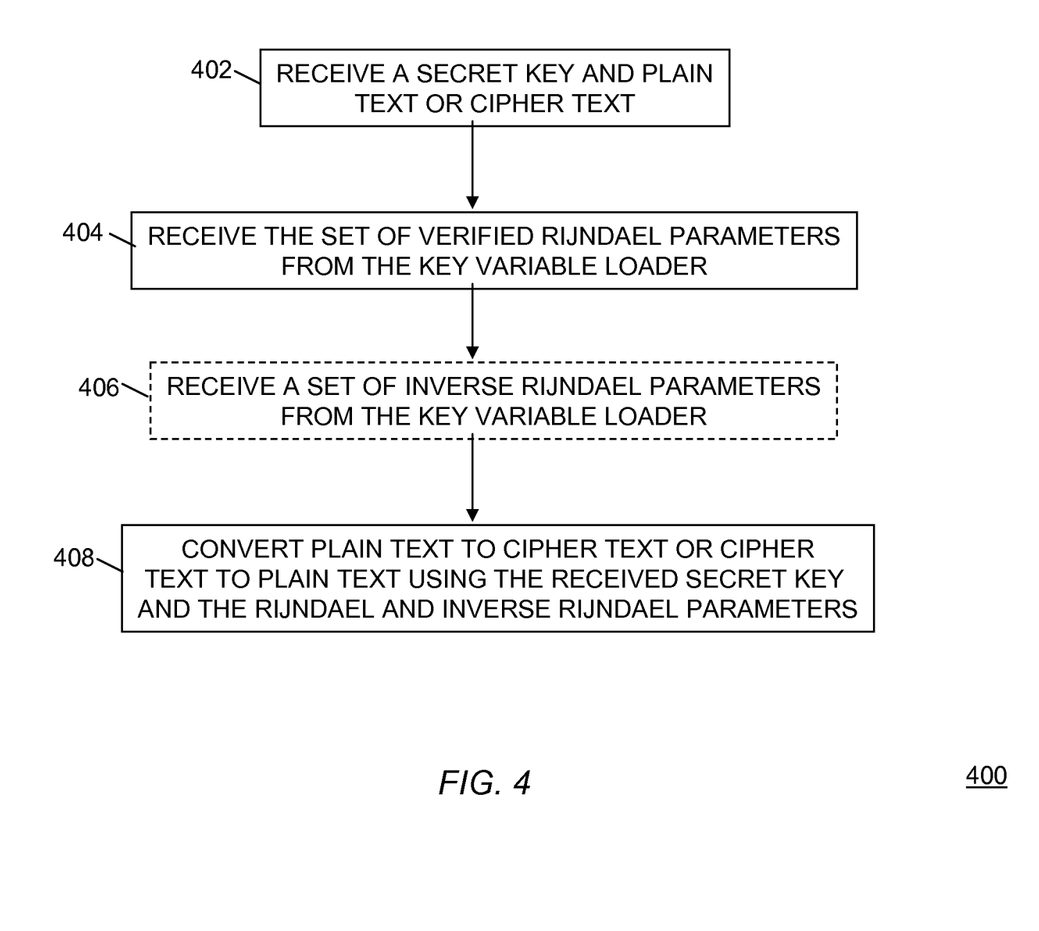
FIG. 4 is a flow diagram illustrating a method for customizing a Rijndael block cipher in accordance with some embodiments.

We now turn to a more detailed description of the functionality of the KVL 106, the subscriber unit 112, and the KMF 114 in the system 100 in accordance with the teachings herein and by reference to the remaining FIGS. 2-4. Turning first to FIG. 3, a flow diagram illustrating a method for customizing a Rijndael block cipher is shown and generally indicated at 300. Method 300 is performed by a KVL, such as the KVL 106, configured and programmed for such functionality. At 302, the KVL receives, "from a simulation computer," a set of Rijndael parameters that were generated and verified by the simulation computer, wherein the set of Rijndael parameters provide an input for implementing at least one step of the Rijndael block cipher and when used with a secret key allow a conversion between plain text and cipher text using the Rijndael block cipher. Receiving the set of Rijndael parameters from the simulation computer means that the set of Rijndael parameters are either downloaded directly from the simulation computer or manually entered into the KVL. The KVL stores (306) the set of Rijndael parameters; and then subsequently provides (310) the set of Rijndael parameters to a device having a customizable Rijndael block cipher, such as the subscriber unit 112 and the KMF 114.

In an embodiment, the set of Rijndael parameters comprises one or more of: a first irreducible polynomial used to define $GF(2^8)$ from which a Rijndael S-box is derived for a SubBytes step of the Rijndael block cipher; a vector and a matrix used to define an affine transformation from which the Rijndael S-box is derived; a set of coefficients in $GF(2^8)$ of a polynomial $c(x)$ modulo $(x^4+1)$ used in a MixColumns step of the Rijndael block cipher; a second irreducible polynomial used to define $GF(2^8)$ in the MixColumns step; and a number of rounds of the Rijndael algorithm. Moreover, the first irreducible polynomial can be the same as or different from the second irreducible polynomial.

Optionally, the KVL receives (304) a set of inverse Rijndael parameters, which were derived from at least one of the parameters in the set of verified Rijndael parameters, and stores (308) the set of inverse Rijndael parameters. The KVL further provides (312) this set of inverse Rijndael parameters to the device having the customizable Rijndael block cipher. In an embodiment, the set of inverse Rijndael parameters comprises at least one of: a set of inverse coefficients derived from a set of forward coefficients of a polynomial $c(x)$ modulo $(x^4+1)$ used in a MixColumns step of the Rijndael block cipher; or an inverse of an affine transformation, wherein the affine transformation is defined by the vector and the matrix that are included in the Rijndael parameters.

In yet another embodiment, the KVL provide the set of Rijndael parameters (and if stored the set of inverse Rijndael parameters) "transparently" or "seamlessly" with the secret key to the other device. By transparently and seamlessly, what is meant is that at whatever time instance the KVL provides the secret key to the device, the KVL further provides the Rijndael parameters without further human intervention. This allows the Rijndael parameters to be provided when the KVL provides the secret key during normal operation such as, for instance, when the KVL is used to provision the secret key into a subscriber unit prior to its initial operation on a communication system such as a radio system.

Turning now to FIG. 4, a flow diagram illustrating a method for customizing a Rijndael block cipher is shown and generally indicated at 400. Method 400 is performed by a device having a customizable Rijndael block cipher, such as the subscriber unit 112 or the KMF 114, configured and programmed for such functionality. At 402, the device receives a secret key at an input (e.g. 204) and plain text or cipher text at an input (e.g., 202) into the customizable Rijndael block cipher (e.g. the cipher block 200 (FIG. 2)) and receives (404) from the KVL, a set of Rijndael parameters at an input 206 that were generated and verified by a simulation computer and provided to the KVL. These Rijndael parameters provide an input for implementing at least one step of the Rijndael block cipher 200, as explained in more detail below. In one embodiment, as mentioned above, the device receives the Rijndael parameters while or at the same time that it receives the secret key, although this is in no way required. In this way, the combination of the secret key and the set of Rijndael parameters or just the Rijndael parameters alone can be said to define a "system key." Moreover, in another embodiment, the device further receives (406) a set of inverse Rijndael parameters at the input 206 of the customizable Rijndael block cipher 200.

The Rijndael algorithm 200 uses the secret key and the set of Rijndael parameters (if inverse Rijndael parameters are provided by the KVL, otherwise the inverse Rijndael parameters needed for the operation of the Rijndael algorithm 200 are generated by the device) to convert (408) the plain text received at an input 202 to cipher text provided at an output 208 or to convert (408) the cipher text received at the input 202 to plain text provided at the output 208. The Rijndael block cipher 200 can be any Rijndael variant, including but not limited to an AES variant, i.e., AES-128, AES-192, or AES-256, which have secret key sizes of 128, 192, and 256 bits, respectively. However, the configurable Rijndael algorithm 200 supports any other key size.

A benefit of the present teachings is that the customizable Rijndael block cipher 200 supports the original AES algorithm depending on the set of Rijndael parameters provided at the input 206. However, in accordance with the present teachings the customizable Rijndael algorithm 200 provides the flexibility of configuring the parameters of one or more steps or transforms upon which the Rijndael algorithm operates to essentially provide the user with a "secret" Rijndael algorithm based on a set of "secret" Rijndael parameters known only to the user. A further benefit of the present teachings is that by enabling the user to specify the size of the secret key and the configuration of the Rijndael parameters, the user is provided the flexibility to select among different Rijndael variants (for example between AES-128 and AES-192). Such a dynamic configurability can further enhance the security of the media transmitted within a communication system.

Moreover, embodiments of the Rijndael algorithm 200 can be performed in software or hardware and can be used with different encoding techniques depending on the data being sent. For instance, when the data is voice, an output feedback mode can be implemented using the Rijndael algorithm to create a key stream and overlay plain text with keystream bits, and the receiver has to generate the same key stream to see the plain text. In another illustrative example, a cipher block change (CBC) mode can be implemented using the Rijndael algorithm to generate a message authentication code (MAC) to authenticate that a message has not been changed during transmission.

Turning now to the specifics of the operation of the Rijndael block cipher 200 and the Rijndael parameters that are provided at the input 206 to support one or more transforms or steps of the Rijndael algorithm. The Rijndael algorithm 200 is specified as a number of repetitions or transformation rounds that convert the input of 202 plain text into the final output 208 of cipher text, wherein the data is handled during the algorithm processing in blocks having a size of 128 bits, for instance, or, in another illustrative implementation, block sizes that mirror the size of the encryption keys. Each round comprises several processing steps, including one that depends on the encryption key. Rijndael uses a variable number of rounds, depending on key/block sizes, for example, 9 rounds if the key/block size is 128 bits, 11 rounds if the key/block size is 192 bits, or 13 rounds if the key/block size is 256 bits Even before the first round, a simple key addition layer is performed, which adds to security. Thereafter, there are Nr-1 rounds (e.g., 9, 11, 13, etc.) and then the final round. Moreover, Rijndael uses transformations that form a "State" when started but before completion of the entire process. The State can be thought of as an array, structured with 4 rows and the column number being the block length divided by bit length (for example, divided by 32), which represents the data block. The cipher key similarly is an array with 4 rows, but the key length divided by 32 to give the number of columns. The blocks can be interpreted as unidimensional arrays of 4-byte vectors, e.g., 4×4 byte arrays.

At a high-level, the Rijndael algorithm 200 comprises four basic sequences. The first sequence is called KeyExpansion, wherein round keys (also referred to herein as subkeys) are derived from the cipher key using a key schedule such as a standard Rijndael key schedule used in AES. However, an on-the-fly round key generator can alternatively be implemented concurrently during the encryption or decryption procedure, which supports all the key sizes, and can generate a 128 bit round key per clock cycle. The second sequence is called Initial Round, which comprises an AddRoundKey step, wherein each byte of the State is combined with the round key using bitwise XOR.

The third sequence is called Rounds and comprises four basic transforms of the Rijndael algorithm 200 and includes: a SubBytes transform, which a non-linear substitution step where each byte is replaced with another according to an S-box (substitution box) that is in standard AES a lookup table but is, in accordance with the present teachings, configurable based upon the Rijndael parameters provided at the input 206; a ShiftRows transform, which is a transposition step where each row of the State is shifted cyclically a certain number of steps; a MixColumns transform, which is a mixing operation that operates on the columns of the State, combining the four bytes in each column; and another AddRoundKey step. The fourth sequence is called Final Round and includes the three transforms of SubBytes, ShiftRows, and AddRoundKey, with no MixColumns transform.

Next described are the four basic transformations or steps of the Rijndael algorithm, which are performed during the Rounds sequence. In the SubBytes step, each byte in the matrix is updated using an 8-bit substitution box, the Rijndael S-box. This operation provides the non-linearity in the cipher. The S-box used is derived from the multiplicative inverse over $GF(2^8)$, defined by an irreducible polynomial that can be designated in the set of input Rijndael parameters. To avoid attacks based on simple algebraic properties, the S-box is constructed by combining the inverse function with an invertible affine transformation, which is also configurable by the user's selection of a vector and a matrix designated in the set of input Rijndael parameters and used to define the affine transformation. Ideally, the S-box is configured to avoid any fixed points (and so is a derangement), and also any opposite fixed points.

The ShiftRows step operates on the rows of the State; it cyclically shifts the bytes in each row by a certain offset. For AES, the first row is left unchanged. Each byte of the second row is shifted one to the left. Similarly, the third and fourth rows are shifted by offsets of two and three respectively. For the block of size 128 bits and 192 bits the shifting pattern is the same. In this way, each column of the output state of the ShiftRows step is composed of bytes from each column of the input state. Rijndael variants with a larger block size have slightly different offsets. In the case of the 256-bit block, for instance, the first row is unchanged and the shifting for second, third and fourth row is 1 byte, 3 bytes and 4 bytes respectively—this change only applies for the Rijndael cipher when used with a 256-bit block. Enabling a user to input the precursors to the S-box (e.g., the irreducible polynomial, vector, and matrix), in accordance with the present teachings, requires much less storage (e.g., about three bytes) than the storage required (e.g., about 256 bytes) to input the entire S-box it accordance with prior art techniques.

In the MixColumns step, the four bytes of each column of the State are combined using an invertible linear transformation. The MixColumns function takes four bytes as input and outputs four bytes, where each input byte affects all four output bytes. Together with ShiftRows, MixColumns provides diffusion in the cipher. The multiplication operation is defined as: multiplication by 1 means leaving unchanged, multiplication by 2 means shifting byte to the left and multiplication by 3 means shifting to the left and then performing XOR with the initial unshifted value. After shifting, a conditional XOR with an irreducible polynomial should be performed if the shifted value is larger than 0xFF. In a more general sense, each column is treated as a polynomial over $GF(2^8)$ (defined by an irreducible polynomial that can be designated in the set of input Rijndael parameters) and is then multiplied modulo $x^4+1$ with a fixed polynomial $c(x)$ whose coefficients (also referred to herein as "forward coefficients" during the encryption procedure) can also be designated in the set of input Rijndael parameters. The coefficients are displayed in their hexadecimal equivalent of the binary representation of bit polynomials from $GF(2)[x]$, and the irreducible polynomials used in the SubBytes step and the MixColumn step can be designated in the set of Rijndael parameters as being the same or as being different.

In the AddRoundKey step, the subkey is combined with the State. For each round, a subkey is derived from the main key using Rijndael's key schedule; each subkey is the same size as the State. The subkey is added by combining each byte of the State with the corresponding byte of the subkey using bitwise XOR.

In performing the decryption procedure using the Rijndael algorithm 200, a set of reverse rounds are applied to transform the cipher text back into the original plain text using the same secret key. During the set of reverse rounds, the algorithm 200 uses a set of inverse coefficients derived from the set of forward coefficients of the polynomial c(x) modulo ($x^4+1$) used in the MixColumns step and also uses an inverse of an affine transformation, wherein the affine transformation is defined by the vector and the matrix that are included in the set of Rijndael parameters. In accordance with the present teachings, one or both of: the set of inverse coefficients; or the inverse of the affine transformation can be provided in the set of inverse Rijndael parameters at the input 206.

Another benefit of the present teachings is that there are no limitations in the selection of GF irreducible polynomials, affine transformation parameters, or MixColumns coefficients except that the parameters included within the set of Rijndael parameters meet the user's particular system requirements for security of communications within the system. Moreover, with the customizable algorithm framework described herein, a provider may test the Rijndael algorithm against any supportive set of customizable Rijndael parameters before releasing it to a customer. This greatly reduces the difficulty of product integration because the provider has full visibility to the customizable Rijndael algorithm. Those skilled in the art will realize that the benefits and advantages described herein are merely illustrative and are not meant to be a complete rendering of all of the advantages of the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for customizing a Rijndael block cipher described herein. The non-processor circuits may include, but are not limited to, a radio receiver, a radio transmitter, signal drivers, clock circuits, power source circuits, and user input devices. As such, these functions may be interpreted as steps of a method to perform the customizing of a Rijndael block cipher described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for customizing a Rijndael block cipher, the method comprising:
a key variable loader performing:
receiving a set of Rijndael parameters that were verified using a simulation computer, wherein the set of Rijndael parameters provide an input for implementing at least one step of the Rijndael block cipher and when used with a secret key allow a conversion between plain text and cipher text using the Rijndael block cipher;
storing the set of Rijndael parameters;
providing the set of Rijndael parameters to a device having a customizable Rijndael block cipher;
storing a set of inverse Rijndael parameters derived from at least one of the parameters in the set of Rijndael parameters, wherein the set of inverse parameters provide an input for implementing at least one step of the Rijndael block cipher;
providing the set of inverse Rijndael parameters to the device having the customizable Rijndael block cipher;
wherein the set of inverse Rijndael parameters comprises one or more of:
a set of inverse coefficients derived from a set of forward coefficients of a polynomial c(x) modulo ($x^4+1$) used in a MixColumns step of the Rijndael block cipher; or
an inverse of an affine transformation, wherein the affine transformation is defined by a vector and a matrix that are included in the set of Rijndael parameters.

2. The method of claim 1, wherein the set of Rijndael parameters comprises:
a first irreducible polynomial used to define $GF(2^8)$ from which a Rijndael S-box is derived for a SubBytes step of the Rijndael block cipher;
a vector and a matrix used to define an affine transformation from which the Rijndael S-box is derived;
a set of coefficients in $GF(2^8)$ of a polynomial c(x) modulo ($x^4+1$) used in a MixColumns step of the Rijndael block cipher;
a second irreducible polynomial used to define $GF(2^8)$ in the MixColumns step.

3. The method of claim 2, wherein the first irreducible polynomial and the second irreducible polynomial are different.

4. The method of claim 1, wherein the set of Rijndael parameters comprises one or more of:
a first irreducible polynomial used to define $GF(2^8)$ from which a Rijndael S-box is derived for a SubBytes step of the Rijndael block cipher;
a vector and a matrix used to define an affine transformation from which the Rijndael S-box is derived;
a set of coefficients in $GF(2^8)$ of a polynomial c(x) modulo ($x^4+1$) used in a MixColumns step of the Rijndael block cipher;
a second irreducible polynomial used to define $GF(2^8)$ in the MixColumns step; or
a number of rounds for the Rijndael block cipher.

5. The method of claim 1 further comprising providing, by the key variable loader, the secret key to the device while providing the set of inverse Rijndael parameters to the device having the customizable Rijndael block cipher.

6. The method of claim 1, wherein providing the set of Rijndael parameters to the device having the customizable Rijndael block cipher comprises providing the set of Rijndael parameters to a subscriber unit or a Key Management Facility.

7. A method for customizing a Rijndael block cipher, the method comprising:
a device, having a customizable Rijndael block cipher, performing:
receiving a secret key for input into the Rijndael block cipher;
receiving, from a key variable loader, a set of Rijndael parameters that were verified using a simulation computer, wherein the set of Rijndael parameters provide an input for implementing at least one step of the Rijndael block cipher and when used with the secret key allow a conversion between plain text and cipher text using the Rijndael block cipher;
receiving a set of inverse Rijndael parameters derived from at least one of the parameters in the set of Rijndael parameters, wherein the set of inverse parameters provide an input for implementing at least one step of the Rijndael block cipher;
wherein the set of inverse Rijndael parameters comprises one or more of:
a set of inverse coefficients derived from a set of forward coefficients of a polynomial c(x) modulo ($x^4+1$) used in a MixColumns step of the Rijndael block cipher; or
an inverse of an affine transformation, wherein the affine transformation is defined by a vector and a matrix that are included in the set of Rijndael parameters.

8. The method of claim 7 further comprising receiving the secret key from the key variable loader while receiving the set of inverse Rijndael parameters.

9. The method of claim 7 further comprising:
receiving, from the key variable loader, a set of inverse Rijndael parameters derived from at least one of the parameters in the set of Rijndael parameters, wherein the set of inverse parameters provide an input for implementing at least one step of the Rijndael block cipher.

10. The method of claim 9, wherein the set of inverse Rijndael parameters comprises one or more of:
a set of inverse coefficients derived from a set of forward coefficients of a polynomial c(x) modulo ($x^4+1$) used in a MixColumns step of the Rijndael block cipher; or
an inverse of an affine transformation, wherein the affine transformation is defined by a vector and a matrix that are included in the set of Rijndael parameters.

11. The method of claim 7, wherein the set of Rijndael parameters comprises:
a first irreducible polynomial used to define $GF(2^8)$ from which the device derives a Rijndael S-box for a SubBytes step of the Rijndael block cipher;
a vector and a matrix used to define an affine transformation from which the device derives the Rijndael S-box;
a set of coefficients in $GF(2^8)$ of a polynomial c(x) modulo ($x^4+1$) used in a MixColumns step of the Rijndael block cipher;
a second irreducible polynomial used to define $GF(2^8)$ in the MixColumns step.

12. The method of claim 11, wherein the first irreducible polynomial and the second irreducible polynomial are different.

13. The method of claim 7, wherein the set of Rijndael parameters comprises one or more of:
a first irreducible polynomial used to define $GF(2^8)$ from which the device derives a Rijndael S-box for a SubBytes step of the Rijndael block cipher;
a vector and a matrix used to define an affine transformation from which the device derives the Rijndael S-box;
a set of coefficients in $GF(2^8)$ of a polynomial c(x) modulo ($x^4+1$) used in a MixColumns step of the Rijndael block cipher;
a second irreducible polynomial used to define $GF(2^8)$ in the MixColumns step; or
a number of rounds for the Rijndael block cipher.

* * * * *